R. ANDREWS.
DEVICE FOR CUTTING CROOKED SCREW THREADS.
APPLICATION FILED MAR. 26, 1913. RENEWED JUNE 25, 1915.
1,170,135.  Patented Feb. 1, 1916.
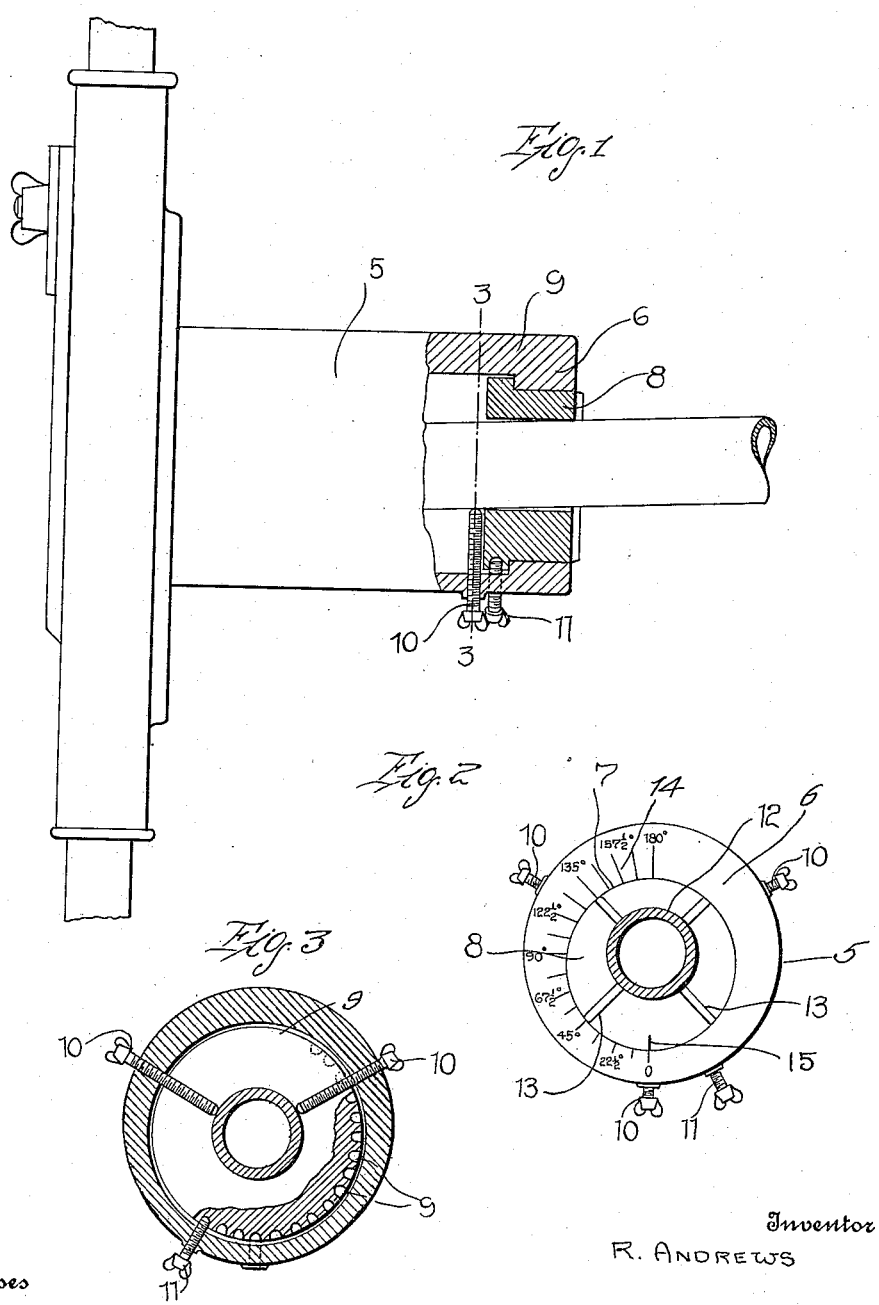

UNITED STATES PATENT OFFICE.

RICHARD ANDREWS, OF CHARLES TOWN, WEST VIRGINIA, ASSIGNOR OF ONE-FOURTH TO OSCAR M. DARLINGTON, ONE-FOURTH TO DANIEL S. HUGHES, ONE-FOURTH TO GEORGE E. DIEHL, AND ONE-FOURTH TO FONTAIN B. HOOFF, ALL OF CHARLES TOWN, WEST VIRGINIA.

DEVICE FOR CUTTING CROOKED SCREW-THREADS.

1,170,135.   Specification of Letters Patent.   Patented Feb. 1, 1916.

Application filed March 26, 1913, Serial No. 757,005. Renewed June 25, 1915. Serial No. 36,383.

*To all whom it may concern:*

Be it known that I, RICHARD ANDREWS, citizen of the United States, residing at Charles Town, in the county of Jefferson and State of West Virginia, have invented certain new and useful Improvements in Devices for Cutting Crooked Screw-Threads, of which the following is a specification, reference being had to the accompanying drawings.

This invention relates to a device for cutting crooked threads and has for its primary object to provide a simple and novel means for easily and quickly adjusting the die carrying stock to angularly position the same with relation to the longitudinal axis of the pipe or rod to be threaded.

Another and more specific object of the invention resides in the provision of a collar loosely mounted with an eccentric opening provided in the rear end of the die stock said collar also having an eccentric opening through which the pipe or rod is adapted to extend, and means mounted in the die stock and coöperating with said collar to securely hold the same in its adjusted position with relation to the stock, whereby the stock, after the dies have been engaged upon the periphery of the pipe may be maintained at the desired angle during the cutting of the threads.

A still further object of the invention is to produce a device for the above purpose which is simple in construction, reliable and durable in practical operation and may be produced at comparatively small manufacturing cost.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is a longitudinal section of a thread cutting tool, partly in section, to which my invention is applied; Fig. 2 is an end elevation. Fig. 3 is a section taken on the line 3—3 of Fig. 1.

Referring in detail to the drawing, 5 designates a die stock which may be of any ordinary or approved construction, the body thereof being provided at its rear end with an inturned flange 6. The inner wall of this flange is eccentrically related to the periphery of the stock body as indicated at 7 for a purpose which will be fully disclosed in the following description. For use in conjunction with the die stock, I provide a collar 8 adapted to be arranged within the eccentric opening 7 of the flange 6. Upon one end of this collar, an annular flange 9 is formed as clearly shown in Fig. 1, and this flange in its periphery is provided with a plurality of spaced cavities or sockets 9'. These sockets are arranged in one half or 180 degrees of the circumferential extent of the collar flange. In the body of the die stock 5 adjacent to the flange 6 thereon, a plurality of holding screws 10 are threaded. While I preferably employ three of these screws as shown in Fig. 2, it will be obvious that any desired number of the same may be used. An additional screw 11 is also threaded in the annular wall of the stock body and this latter screw is adapted for binding engagement in any one of the sockets or recesses 9' provided in the periphery of the collar flange 9.

The collar 8 has an eccentric pipe receiving opening 12 formed in its body as clearly shown in Fig. 2. This collar is loosely mounted for adjustable rotative movement in the opening 7 of the flange 6 formed upon the body of the die stock, and for this purpose, the collar is provided upon its outer end face with a plurality of finger pieces 13 whereby the same may be readily turned. It will be observed from reference to Fig. 2 that the outer face of the inturned flange 6 on the stock body is provided with graduations 14 extending through 180 degrees around the eccentric opening 7 in said flange. The face of the collar 8 has an indicating mark 15 thereon which is adapted to be registered with any one of the graduations upon the flange 6 by turning the collar within the opening 7 of said flange. As shown in Fig. 2, the collar is arranged for the cutting of a straight thread upon the periphery of a pipe or rod, the mark on said collar being registered with the zero graduation upon the flange 6.

When it is desired to cut a crooked thread upon the pipe, the collar 8 is turned by means of the finger pieces 13 to the right and the mark 15 thereon moved into registration with the desired graduation mark upon the scale 14. It will be obvious that in this turning movement of the collar 8, the stock body will be turned to an angle with relation to the longitudinal axis of the pipe as shown in Fig. 1. The cutting dies are now adjusted into engagement with the periphery of the pipe or rod so that upon the turning movement of the stock, they will cut an angular or crooked thread thereon. It is of course, understood that after the collar has been adjusted, the holding screw 11 is threaded inwardly into engagement with one of the sockets 9' in the collar flange, said sockets being equal in number to the degrees marked upon the face of the flange 6. The screws 10 are also threaded inwardly into engagement with the periphery of the pipe and prevent longitudinal movement inwardly of the collar 8 in the stock body. These screws however, are spaced sufficiently from the flange 9 of the collar to permit of the easy turning movement of said collar within the body of the die stock.

From the foregoing, it is thought that the construction and manner of operation of my invention will be clearly and fully understood. The same resides primarily in the provision of the collar adjustably mounted in the eccentric opening of the stock body whereby either a straight or crooked thread may be cut upon the pipe or rod. These collars may be provided with pipe receiving openings of various sizes upon which the threading tool is capable of operating.

My invention is applicable to all pipe threading tools now known in the art without necessitating any material alterations in their construction.

As the device is extremely simple, it will be obvious that the same can be manufactured at small cost and may also be easily and quickly applied in position for use and readily adjusted within the stock body to properly dispose the stock at the desired inclination with relation to the axis of the pipe or rod.

While I have above disclosed the preferred form and construction of the several elements employed, it will be understood that the same are susceptible of considerable modification without departing from the essential features or sacrificing any of the advantages of the invention.

Having thus described the invention, what is claimed is:

1. The combination with a die stock, of a collar provided with a pipe receiving opening, said collar being eccentrically mounted within the die stock, for rotative movement and engaging the wall thereof, said collar having a plurality of spaced cylindrical sockets, and a screw threaded in the stock body adapted for engagement in said sockets to secure the collar in an adjusted position within the body and maintain the pipe to be threaded at a desired inclination with relation to the longitudinal axis of the stock.

2. The combination with a die stock having an opening in one end of its body eccentrically related to the periphery thereof, a collar loosely arranged in said opening for rotative movement, said collar being also provided with an eccentric opening for the reception of the pipe to be threaded, and means for securing the collar in an adjusted position in the stock body.

3. The combination with a die stock having an opening in one end of its body eccentrically related to the periphery thereof, and means adjustably mounted in said opening and engaging the pipe or rod extending through the die stock to maintain the die stock at an inclination relative to the longitudinal axis of said pipe or rod.

4. The combination with a die stock provided in the rear end of its body with an eccentric opening, of a collar loosely mounted in said opening for rotative movement, said collar being also provided with an eccentric opening for the reception of the pipe to be threaded, means mounted in the stock body to prevent longitudinal movement of the collar therein, and additional means mounted in the stock body to secure said collar in an adjusted position within the eccentric opening of the body and maintain the die stock at an inclination relative to the longitudinal axis of the pipe.

5. The combination with a die stock provided in its rear end with an eccentric opening, of a collar loosely mounted in said opening for rotative movement and having an annular flange on one end, said collar also having an eccentric opening for the reception of the pipe to be threaded, a plurality of screws threaded in the body of the stock to prevent longitudinal movement of the collar into the stock body, the flange on said collar being provided in its periphery with a plurality of spaced sockets, and an additional screw threaded in the stock body for engagement in said sockets to secure the collar in its adjusted position and maintain the die stock at an inclination with relation to the longitudinal axis of the pipe.

In testimony whereof I hereunto affix my signature in the the presence of two witnesses.

RICHARD ANDREWS.

Witnesses:
O. M. DARLINGTON,
JOHN H. BISHOP.

Copies of this patent may be obtained for five cents each, by addressing the "Commissioner of Patents, Washington, D. C."